July 12, 1932. M. LEBEDINSKY 1,866,655
FILTER FOR PREVENTING DISTORTION
Filed March 16, 1928 2 Sheets-Sheet 1

M. Lebedinsky
INVENTOR

By: Marks & Clerk
Attys

July 12, 1932.  M. LEBEDINSKY  1,866,655

FILTER FOR PREVENTING DISTORTION

Filed March 16, 1928   2 Sheets-Sheet 2

M. Lebedinsky
INVENTOR

By: Marks & Allen
ATTYS.

Patented July 12, 1932

1,866,655

UNITED STATES PATENT OFFICE

MYRON LEBEDINSKY, OF PARIS, FRANCE, ASSIGNOR TO SOCIETE DES TELEPHONES GRAMMONT, OF PARIS, FRANCE, A COMPANY OF FRANCE

FILTER FOR PREVENTING DISTORTION

Application filed March 16, 1928, Serial No. 262,260, and in France March 26, 1927.

Range filters are often used in telephonic plants and chiefly in repeater stations with a view to stop practically all the currents the frequency of which is outside two given values; the lower frequencies are eliminated so as to prevent certain parasitic noises and the higher frequencies, those having a frequency above 14 kilocycles for instance so as to prevent undesired oscillations from arising.

On the other hand the damping to which the currents are submitted by reason of their passage in the line wires and the several parts connected therewith depends on the frequency and is stronger for the higher frequencies than for the lower, the result thereof is a deformation of the sounds termed distortion.

Now, the damping due to a range filter is substantially constant between the extreme values of the range as shown by curve $a$ of Fig. 1; to fight against distortion the lower frequencies should be more damped than the higher and consequently the damping curve should be similar to that shown by curve $b$ of Fig. 1. In Figure 1, the frequencies have been inserted in abscissa and the damping curves in ordinates so as to be able to define the relative diminutions of amplitude per unit of time. In other words, if an oscillation has at one moment an amplitude $A$, at one moment $t+\Delta t$, an amplitude $A-\Delta A$, the damping curve will be defined by the relation $$\frac{\Delta A}{A \times \Delta t}.$$

To reach this result it is necessary to use beyond the filter a device for preventing distortion.

The object of the present invention is a simple device playing together the part of a filter and that of the device preventing distortion that is allowing a damping curve such as curve $b$ to be obtained.

This device consists in a filter cell with mutual induction closed over a condenser shunted by a resistance without inductance and inserted in series in the line.

The following description and the appended figures give by way of example a form of execution of the invention.

Fig. 1 gives as stated hereinabove the damping curves.

Figure 1:
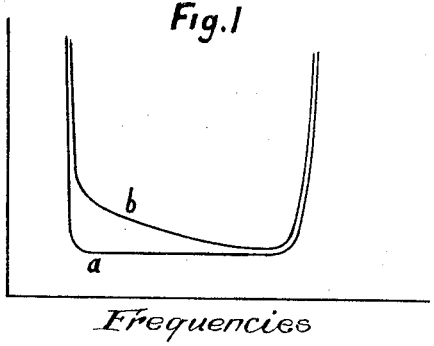

The line leads, directly or not, to the ends of the primary 1 (Fig. 2) of the transformer acting on the grid of the repeater; this primary is cut in two and between the ends 2 and 3 of the gap is inserted the device which is the object of the invention. It comprises four windings 4, 5, 6, 7 placed over the same core; a condenser 8 is disposed in shunt between the points common to the windings 4 and 5 in series with one half of the primary on one hand and the windings 6 and 7 in series with the other half on the other; the outer ends of the windings 5 and 6 are connected through the resistance 9 showing no inductance and shunting the condenser 10.

The windings are disposed in a manner such that the magnetic fluxes produced through the core by the windings 4 and 5 are directly opposed; the same is the case for the windings 6 and 7.

Figure 3:
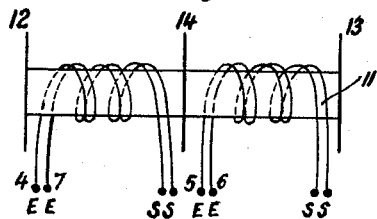
Figs. 3 and 4 show diagrammatically the arrangement of the windings on the coil.
Figure 4:
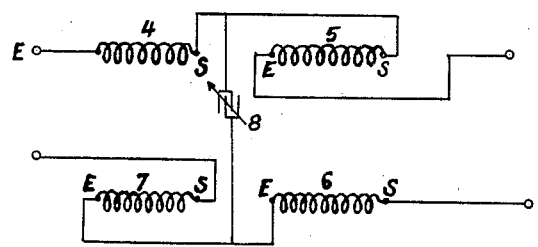

Figs. 3 and 4 show a preferred manner of disposing the windings on the core. The spool 11 supporting the windings has an iron core not shown and has end flanges 12 and 13 and an intermediary flange 14. The windings 4 and 7 are constituted by a double wire wound between the faces 12 and 14; the windings 5 and 6 are constituted in a similar fashion and disposed between the faces 14 and 13.

The connections may be provided by connecting together the outer ends SS of the windings 4 and 5 and the inner ends EE of the windings 6 and 7 as shown on Fig. 4.

Figure 2:
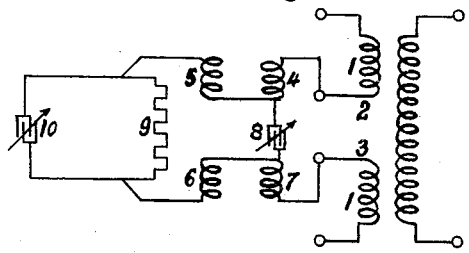
Fig. 2 shows diagrammatically a device according to the invention, which device is supposed to be used at the input side of a receiver.

The device may however, be arranged otherwise than as shown on Fig. 2.

It may be for instance in series with the primary or the secondary of one of the transformers on the input or output side, or inserted in one of the windings of these transformers or again placed between two stages of amplification of the repeater.

Figure 5:
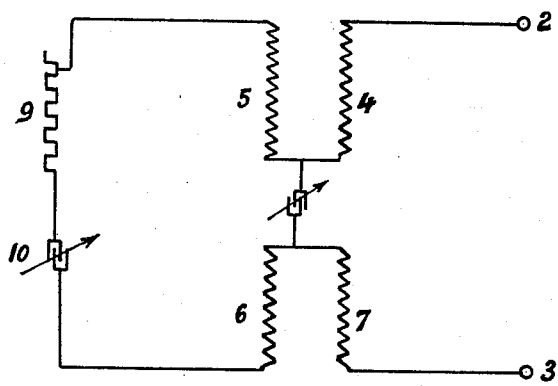
Figs. 5 and 6 are modifications of Fig. 2.

The condenser instead of being in shunt relation with the resistance without inductance may be inserted in series therewith (Fig. 5).

Experience has shown that with such a device inserted in its circuit, the gain of the repeater can be represented in relation to frequency by a curve whose figure can be varied by varying the values of the capacities of the condensers 8 and 10 and of the resistance 9. And experience has shown also that all these curves have a common point for the frequencies of 500 cycles, and that by adjusting the condenser 10 it is possible to vary the figure of the curve but only for the frequencies lower than 500 cycles, the adjustment of resistance 9 modifying the curve only between the frequencies of 500 and 2100 cycles, the adjustment of the condenser 8 modifying said curve only for frequencies above 1900 cycles. In consequence the device is easily adjusted so as to correct the attenuation produced by the cable. Knowing the curve representing such attenuation in relation to frequency it is possible to design a curve $c$ representing the gain of the repeater, in such a manner that the resulting effect of said cable and said repeater be represented in relation to frequency by a curve like $a$ of Fig. 1. To obtain with the repeater a curve very near of the theoretical curve $c$, one will adjust separately and successively the condensers 8 and 10 and the resistance 9, in such a way that curve of the repeater has common points with curve $c$ for the frequencies of say 300 cycles (and that is obtained by adjustment of condenser 10), 1600 cycles (obtained by resistance 19) and 2200 cycles (obtained by condenser 8). The result of such operation is quite satisfactory in practice.

A number of filter cells may be used instead of one cell in which case they are disposed in series, the last cell being closed over a device which may be resonant or not.

Figure 6:
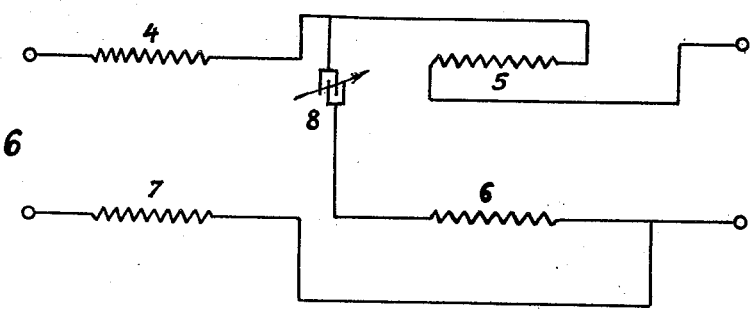
Figure 7:
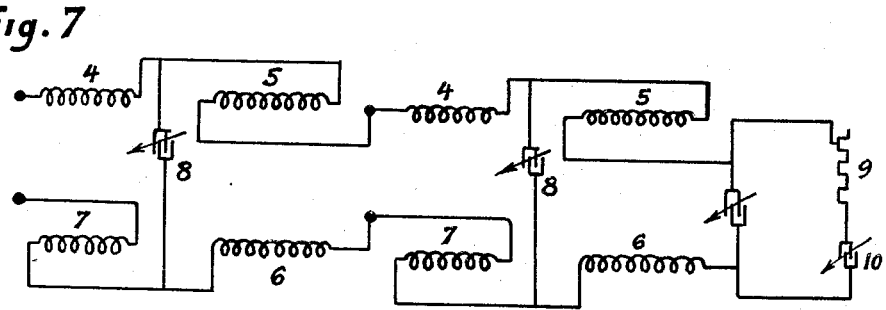
Fig. 7 shows diagrammatically a device with a plurality of net works.

On the other hand the connections in the filter cell may be altered so as to obtain a more or less great resonancy; the cell is then no longer symmetrical. Fig. 6 shows diagrammatically by way of example a form of execution of such a cell. Fig. 7 shows diagrammatically a device comprising two networks according to Fig. 4.

With a four wire circuit no filter is necessary for preventing undesired oscillations but the device may nevertheless be used against distortion.

What I claim is:

1. A filter adapted to prevent distortion in telephonic circuits inserted in series in said circuits and comprising at least one four pole network constituted by four inductance coils wound on a single magnetic core, means to connect in series the first input pole, the two first of said inductance coils and the first output pole in such a manner that the magnetic flux generated by one of said coils be in opposite direction with the magnetic flux generated by the other, means to connect in series the second input pole, the two remaining coils and the second output pole in such a manner that the magnetic flux generated by one of said coils be in opposite direction with the flux generated by the other, an adjustable condenser disposed between the connection point of the two first coils and the connection point of the remaining ones, means to insert the input poles in the telephone circuit, an adjustable ohmic resistance without self induction and an adjustable condenser disposed in series and connecting to each other the output poles of the network.

2. A filter adapted to prevent distortion in a telephonic circuit inserted in said circuit and comprising at least two networks according to claim 1 the input poles of the first network being inserted in the telephonic circuit, its output poles being connected to the input poles of the second network, and so on the output poles of the last network being connected to each other by an adjustable ohmic resistance without self induction and an adjustable condenser disposed in series.

In testimony whereof I have affixed my signature.

MYRON LEBEDINSKY.